May 2, 1950 S. W. LICHTMAN 2,505,777
AUTOMATIC VOLUME CONTROL FILTER CIRCUIT
Filed April 12, 1946
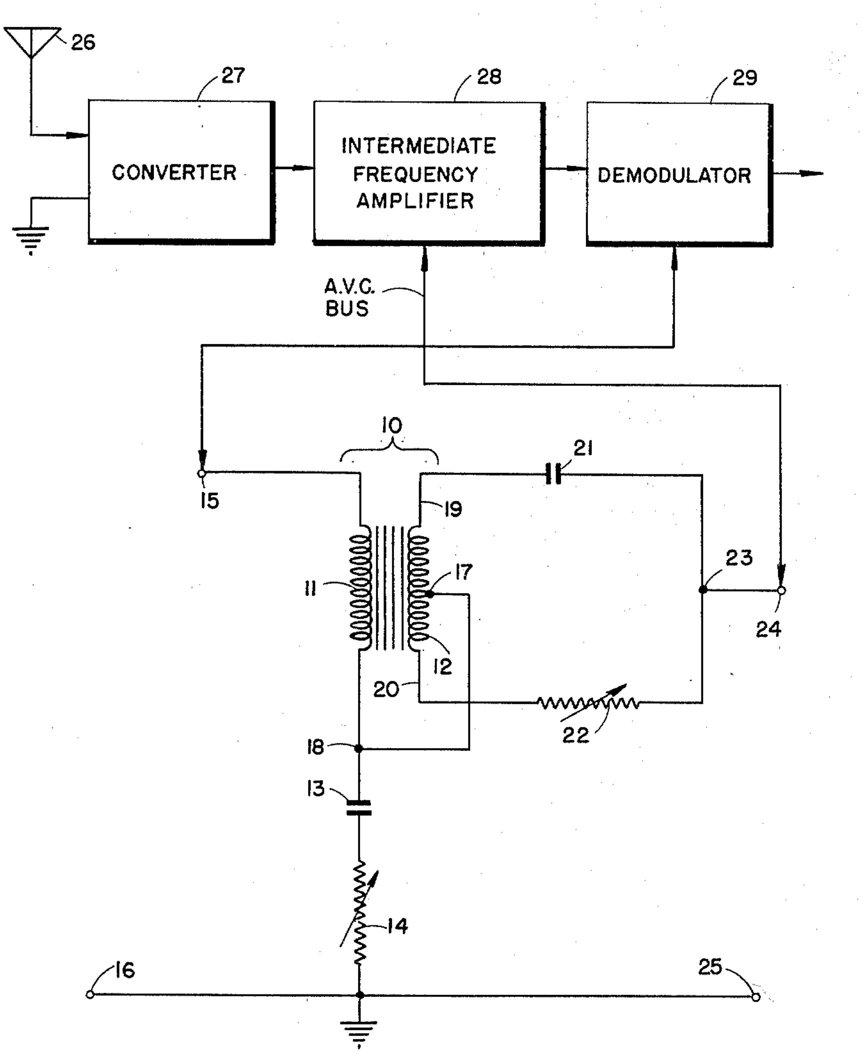
INVENTOR.
SAMUEL W. LICHTMAN
BY M. C. Hayes
ATTORNEY Patented May 2, 1950

2,505,777

UNITED STATES PATENT OFFICE 2,505,777

AUTOMATIC VOLUME CONTROL FILTER CIRCUIT

Samuel W. Lichtman, Washington, D. C.

Application April 12, 1946, Serial No. 661,632

3 Claims. (Cl. 178—44)

(Granted under the act of March 3, 1883, as amended April 30, 1928; 370 O. G. 757)

This invention relates to electrical energy filtering devices and more particularly to a filter device having low impedance to D. C. energy but capable of providing effective elimination of signals of a selected frequency.

Frequently it is necessary to substantially eliminate from a signal channel all energy of a single frequency while at the same time producing very slight attenuation of a D. C. energy component associated therewith. Such a necessity arises, for example, in the automatic volume control filtering circuit for a radio receiver designed for single modulation frequency reception. The automatic volume control signal varying in dependency on the amplitude of received signals as derived in the detector circuits of a receiver generally includes an A. C. energy component having a frequency equal to the modulation frequency and a D. C. energy component. To prevent demodulation of the received energy signal by A. V. C. action responsive to the modulation component, the D. C. component applied to critical points in the receiver must not contain modulation components. Conventional filter circuits as frequently used in A. V. C. circuits do not provide suitable elimination of the A. C. component unless some compromise of response rate to a changing D. C. component is made.

Accordingly it is an object of this invention to provide a filter device for elimination of an electrical energy component of a definite and known frequency.

Another object is to provide a filter device having a low D. C. impedance path for the elimination of electrical energy having a definite and known frequency.

In order that the invention may be clearly understood and readily carried into effect it will now be described more fully by way of example with reference to the accompanying figure which is a schematic diagram showing partially in block form one embodiment of the features of the present invention.

According to the general concept of the present invention, an electrical energy filtering device having only slight attenuation effect on D. C. signals is provided which eliminates energy components having a definite and known frequency. Such a filter device would find application, for example, in an automatic volume control system of a receiver. Elimination of the A. C. component of a signal containing both an A. C. component and a D. C. component is accomplished with a minimum compromise of response to the D. C. signal component by dividing the A. C. component into two parts and then recombining the parts in special phase comparison apparatus to effect removal of energy at a selected frequency where phase opposition of the two parts occurs.

In particular, the invention as typified in the figure includes a transformer 10, preferably having a unity voltage ratio between primary winding 11 and secondary winding 12. Primary winding 11 is in a series electrical circuit including capacitance 13 and resistance 14 placed across the input terminals 15, 16. A center tap 17 of the secondary 12 winding is connected to the junction point 18 between winding 11 and capacitance 13.

Division of the input voltage to terminals 15, 16 across the series circuit results in the application of the part of the input voltage appearing across winding 11 to the ends 19, 20 of secondary 12 in push-pull. Similarly, the part of the voltage appearing across capacitance 13 and resistance 14 is applied to the ends 19, 20 in push-push.

The voltage divider elements 13, 14 are primarily amplitude control elements operating to control the amplitude of the push-push signal obtained at ends 19, 20 relative to the push-pull signal induced in the secondary from primary 11.

Phase shifting of the induced signal relative to the direct push-push signal of the secondary 12 is produced by the series combination of secondary 12, capacitance 21, and resistance 22. The phase of the induced signal obtained at point 23 can be varied over a range of nearly 180 degrees by the adjustment of the resistance 22. This action is readily seen by taking the limiting conditions. With resistance 22 extremely large, the capacitance 21 is substantially a short circuit and the induced voltage appearing at point 23 is in phase with that induced at end 19. With the resistance 22 very small, capacitance 21 charges considerably during the periof of a half cycle of the induced signal so that the induced voltage at point 23 is substantially in phase with the voltage induced at point 20.

The A. C. energy output appearing between terminals 24, 25 comprises the vector combination of the induced voltage from the secondary 12 which is of selectable phase and the voltage developed at the junction point 18 which is of selectable amplitude. Elimination of energy having a definite and known frequency will result if these two voltages are equal in amplitude and have 180 degrees phase relationship. Equality of amplitude can be obtained by adjustment of the variable resistance 14. Adjustment of the variable resistance 14 will have opposite effects on the amplitudes of the direct and induced voltages.

The desired phase relationship between the induced voltage developed at point 23 and the push-push voltage of point 18 can be obtained by adjusting the resistance 22. Adjustment of resistance 22 causes a change in the phase of the induced voltage resulting at point 23 with negligible effect on the voltage developed at point 18. Since the amplitude of the induced voltages at points 19 and 20 is substantially independent of the resistance 22 and capacitance 21, phase shift is relatively independent of the amplitude of the voltages.

In accordance with the foregoing discussion oscillatory energy having a selected frequency applied to input terminals 15, 16 may be eliminated from the output terminals 24, 25 by adjustment of amplitude control 14 and phase control 22 to produce voltages having equal amplitude and opposite phase relationship which are combined at point 23.

Direct current continuity is provided by direct coupling of one end 18 of the primary winding 11 to the center point 17 on the secondary winding 12.

It should be noted that the capacitive and resistive components of the filter system may be relatively small resulting in a fast acting filter. Typical values employed for elimination of 30 cycle per second signals with a typical transformer are capacitive elements 13, 21 of 0.25 and 0.02 microfarad, respectively, and resistive elements 14, 22 of 2,000 and 50,000 ohms, respectively. Employing the filter system in an automatic volume control network having a detector load resistance of 20,000 ohms connected across terminals 15, 16, the time constant of the filter system will be approximately 0.006 second. Accordingly, fast acting automatic volume control for an amplifier system may be obtained by utilizing the filtering system to supply a direct current control signal without losing the 30 cycle per second modulation component of the signal input to the receiver.

A typical manner of connecting the filter network to a radio receiver system designed for the reception of modulated signals having a single modulation frequency is also shown in the figure. Radio frequency signals intercepted by the antenna 26 are applied to a conventional superheterodyne frequency conversion stage 27. Output signals from the conversion stage are applied to a selective amplifier such as the fixed tuned intermediate frequency amplifier 28. Amplifier 28 may be conventional in form, employing remote cut-off tubes whose transconductance may be varied by adjustment of the grid biasing voltage thereon. It is important, however, that the decoupling networks associated with the grid circuits have relatively short time constants so that rapid response to a changing automatic volume control voltage is possible.

Amplified signals from the amplifier 28 are supplied to a demodulator 29 so that a D. C. voltage component in amplitude dependency on the amplitude of the output signal from amplifier 28 may be derived. Typically, demodulator 29 is of the diode type, conductive only during a part of output signal period. Included in the circuit of the demodulator 29 is a long time constant filter circuit operative to remove the component of the output signal at the frequency of the amplifier 28 retaining an A. C. component at the frequency of the modulation on the signal intercepted by the antenna 26 and a D. C. component in magnitude dependency on the amplitude of the intercepted signal.

These two components are supplied to the filter circuit, including components associated with the transformer 10, which operates to remove the A. C. component yet retain a low impedance to variations in the D. C. component occurring at other than the frequency of the A. C. component.

The output signal from the filter system is applied to the intermediate frequency amplifier 28 to vary the amplification produced thereby in a sense tending to hold the amplitude of the amplifier output signal substantially constant.

From the foregoing discussion it is apparent that considerable modification of the features of this invention is possible and while the device herein described and the form of apparatus for the operation thereof constitutes a preferred embodiment of the invention it is to be understood that the invention is not limited to this precise device and form of apparatus and that changes may be made therein without departing from the scope of the invention which is defined in the appended claims.

The invention described herein may be manufactured and used by or for the Government of the United States of America for governmental purposes without the payment of any royalties thereon or therefor.

What is claimed is:

1. An electrical energy filtering device for removing selected frequency parts from an input signal containing a plurality of frequency parts, comprising; a transformer having primary and center tapped secondary windings, a first capacitive and resistive network forming together with the transformer primary winding a series network for dividing the input signal into two components, a second capacitive and resistive network forming with the secondary winding of said transformer a series phase shift network producing from one of the signal components a signal in phase dependency on the frequency of the input signal, and means combining a second component of the input signal with the phase shifted signal whereby cancellation thereof occurs at a selected input signal frequency.

2. In combination, an amplification system having controllable amplification characteristics, signal input means supplying to the system a signal to be amplified, demodulator means deriving a D. C. voltage level in dependency on the amplitude of the output signal from the amplification system, an electrical energy filtering device operative from the output of the demodulator means to instantaneously remove selected frequency components in the output thereof, comprising; a transformer having primary and center tapped secondary windings, a first capacitive and resistive network forming together with the transformer primary winding a series network for dividing the input signal into two components, a second capacitive and resistive network forming with the secondary winding of said transformer a series phase shift network producing from one of the signal components a signal in phase dependency on the frequency of the input signal, and means combining a second component of the input signal with the phase shifted signal whereby cancellation thereof occurs at a selected input signal frequency, the second amplitude component whereby amplitude cancellation of the selected frequency energy component results, and means applying the resulting filter output signal to the amplification system to control the amplification thereof.

3. An electrical energy filtering device for removing selected frequency components from a complex input signal containing a direct current component, comprising; a transformer having primary and center tapped secondary windings, a first capacitive and resistive network forming together with the transformer primary winding a series network for dividing the input signal into first and second signal components respectively, a second capacitive and resistive network forming with the secondary winding of said transformer a series phase shift network producing from the first signal component a signal in phase dependency on the frequency of the input signal, and means including a low direct current impedance path and the secondary winding of the transformer for combining the second signal component of the input signal with the phase shifted signal whereby cancellation occurs at a selected input signal frequency.

SAMUEL W. LICHTMAN.

REFERENCES CITED

The following references are of record in the file of this patent:

UNITED STATES PATENTS

| Number | Name | Date |
|---|---|---|
| 1,808,589 | Amsden | June 2, 1931 |
| 2,072,946 | Farnham | Mar. 9, 1937 |
| 2,141,944 | Thompson | Dec. 27, 1938 |

FOREIGN PATENTS

| Number | Country | Date |
|---|---|---|
| 528,300 | Great Britain | Oct. 25, 1940 |
| 714,577 | France | Nov. 17, 1931 |